Dec. 2, 1930.  J. W. HOLT  1,783,571

METHOD OF MAKING ELECTRICALLY WELDED TUBING

Filed April 18, 1927

INVENTOR.
John W. Holt
BY
Fay, Oberlin & Fay
ATTORNEYS.

Patented Dec. 2, 1930

1,783,571

UNITED STATES PATENT OFFICE

JOHN W. HOLT, OF CLEVELAND HEIGHTS, OHIO

METHOD OF MAKING ELECTRICALLY-WELDED TUBING

Application filed April 18, 1927. Serial No. 184,460.

In electric machine-welding where edges of sheet stock are involved, it has been proposed heretofore to employ alternating current and gauge the feed along the seam at such a rate that the alternations in current flow will occasion alternate points of relatively high and low heat to provide a stitch-weld. The necessities of the relation between the frequency of the current, the rate of feed of the work, and the pressure applied are circumscribed however, and close limitations on the possibilities of such method are imposed. A procedure independent of such a relation for spacing effect, and applicable also with direct current as well as alternating is greatly desirable.

To the accomplishment of the foregoing and related ends, the invention, then, consists of the features hereinafter fully described, and particularly pointed out in the claims, the following description and the annexed drawing setting forth in detail but a few of the various ways in which the principle of the invention may be employed.

In said annexed drawing:—

Figure 1:
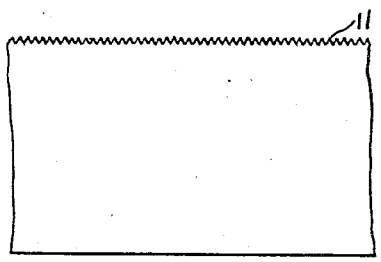
Figure 2:
Figure 5:
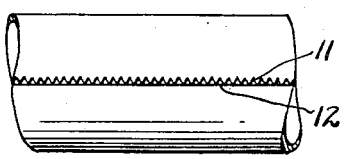
Figure 4:
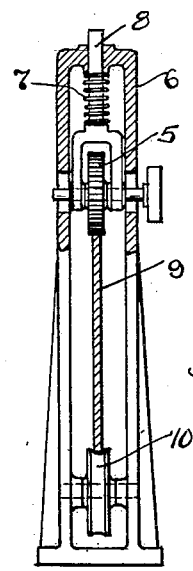
Figure 6:
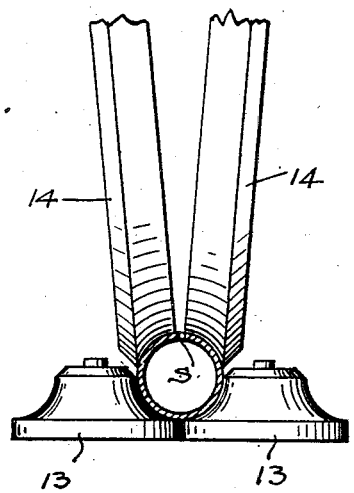
Figure 3:
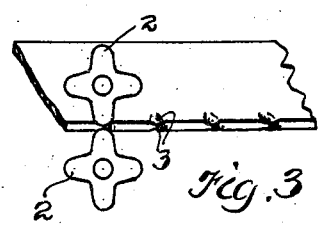

Fig. 1 is a plan view of a portion of a blank showing an edge in preparation for welding; Fig. 2 is a side view of the same; Fig. 3 is a schematic view showing the preparation of a blank; Fig. 4 is a sectional view showing mechanism on a different order; Fig. 5 is a side elevation showing the relation of the seam in tube formation; and Fig. 6 is a view in front elevation showing the final step of operation for tubing.

In proceeding in accordance with my invention, a metal piece to be welded is provided with spaced points of higher resistance. This may be done in any suitable way. Generally, it is most convenient to provide spaced thinned points along the edge, as for instance by passing the edge between rolls, one or both of which have teeth which indent the metal. For example, rolls having projections 2, Fig. 3, which correspondingly thin the metal as at 3 as it is passed therebetween. In the form shown in Fig. 4, a toothed wheel 5 driven by suitable means, and adjustably backed up in its mounting 6 by a spring 7 on the spindle 8 is arranged to engage against the edge of a metal blank 9 which is fed through on a roller 10. With the blank prepared as to its edge, it is then apposed on a portion of metal to which it is to be joined, and a welding electric current is passed through the seam. If tubing is to be formed, the edge of the blank is apposed against the corresponding other edge, as fashioned into tubular form, Fig. 5, the thinned points 11 as there shown being apposed against the edge 12 of the blank as so brought into position. On being now passed between the pressure rolls 13 and the electrode rolls 14, welding current is passed across between the electrode rolls through the seam at $s$, and being fed along through such machine, a weld at the seam is obtained. The provision of spaced points of higher resistance, as will thus be seen, most effectively serves to direct and localize heating spots, as desirable in welding, and particularly so for seam welding of stitch type. Applicable thus generally to seam formation where blanks requiring an edge apposition on at least a part, the method is furthermore especially advantageous where a blank is to be turned into tubing form. In some cases where two edges are to be brought together, both edges may be treated for the providing of the points of higher resistance if desired. In apposing such edges then, the points should have been irregularly spaced, or at least they should not be apposed in fully interdigitating position whereby to make an exactly fitting seam at all points, otherwise the advantage of higher resistance points will be correspondingly lost.

It will be noticed that in making tubing in this manner with a serrated edge to limit and localize the current flow, the welding proceeds at correspondingly located points while the spaces in between remain relatively cool and thus limit the amount of upset with its consequent formation of a flash or fin as the heated seam passes between the pressure rolls. A seam thus obtained is not objectionably prominent as in the case where too much upset is produced.

Other modes of applying the principle of the invention may be employed, change being made as regards the details dislosed, provided the steps stated in any of the following claims or the equivalent of such be used.

I therefore particularly point out and distinctly claim as my invention:—

1. A method of electric welding, which comprises deforming an edge of a sheet metal strip into a series of spaced tapering points with corresponding lateral pockets at their bases, placing such edge against the other portion of metal to which it is to be welded, passing a welding current through such seam, and applying pressure while the metal is soft.

2. A method of electric welding, which comprises deforming an edge of a sheet metal strip into a series of laterally-tapering points by compressing face-wise of the margin at spaced intervals, placing an edge against another edge with which it is to be welded, passing a welding current through such seam, and applying pressure while the metal is soft.

3. A method of electric welding, which comprises deforming an edge of a sheet metal strip into a series of laterally-tapering points by compressing face-wise of the margin at spaced intervals, turning the edges of the strip together in tube-form, passing a welding current through such seam, and applying pressure while the metal is soft.

4. Skelp of sheet metal having an edge deformed into a series of spaced tapered points with corresponding lateral depressions in such edge at the bases of the points.

Signed by me this 15th day of April, 1927.

JOHN W. HOLT.